United States Patent [19]
Kovacic

[11] 3,878,387
[45] Apr. 15, 1975

[54] BICYCLE SIGNAL SYSTEM
[75] Inventor: Zarko Kovacic, Chicago, Ill.
[73] Assignee: U.S. Bike-Lite, Inc., Chicago, Ill.
[22] Filed: June 24, 1974
[21] Appl. No.: 482,351

[52] U.S. Cl. ............... 240/7.55; 200/61.12; 240/58
[51] Int. Cl. ........................... B62j 5/00; H01h 3/16
[58] Field of Search .................. 240/7.55, 10.5, 58; 200/61.12

[56] References Cited
UNITED STATES PATENTS
| | | | |
|---|---|---|---|
| 2,090,805 | 8/1937 | Oliver | 240/7.55 X |
| 2,546,610 | 3/1951 | Pacurar | 200/61.12 |
| 2,728,824 | 12/1955 | Whildin | 240/7.55 X |
| 3,188,418 | 6/1965 | Pino | 200/61.12 |
| 3,521,233 | 7/1970 | Inoue | 200/61.12 X |

Primary Examiner—Richard A. Wintercorn

[57] ABSTRACT

A stop light system for bicycle brakes embodying a battery pack and an electrical signal lamp appropriately mounted on the bicycle frame and having a contact element positioned for engagement with one of the movable brake shoe levers of the bicycle. The contact, when engaged by the brake shoe lever, completes an electrical circuit through the signal lamp, thus illuminating the same.

3 Claims, 3 Drawing Figures

PATENTED APR 15 1975 3,878,387

BICYCLE SIGNAL SYSTEM

The present invention relates to a signal light for a bicycle and has particular reference to a novel automatically operable stop light system which is capable of being readily applied to a bicycle having a caliper type brake mechanism and which, when so applied, cooperates with the brake system to illuminate a signal or "stop light" each time the bicycle brakes are actuated for braking purposes.

During the past decade, practically all bicycles which are designed for adult or near adult use are equipped with hand-operated caliper brakes which cooperate with the wheel rims of the front and/or rear wheels to retard the motion thereof, such caliper brakes largely supplanting the earlier pedal-operated coaster brakes which had long been in vogue. Present day caliper brakes are, generally speaking, constructed in two types, namely, the side pull type and the center pull type. These two types are quite similar, and each embodies a pair of levers which carry brake shoes that straddle the associated wheel rim and which serve, when the levers are operated, to force the brake shoes into sliding frictional engagement with the wheel rims, thus retarding the rotational motion of the wheel. The advantage of such caliper brakes over the earlier coaster brake are numerous, the principal advantage being that the application of friction to the wheel at a region close to the periphery thereof is more effective than when frictional retardation is applied to the wheel near the wheel hub. The difference between the side pull and the center pull caliper brake mechanisms is that in the former mechanism the brake-operating pull cable is attached on only one of the two brake levers, albeit movement of both levers is attained by reason of a compound leverage system which is effective between the two layers, whereas in the center pull mechanism, the pull cable is attached to both levers and is effective thereon to actuate them simultaneously and with equally divided force.

The caliper brakes which are employed in connection with different manufacturers of bicycles do not differ appreciably among one another, and all of them employ steel or other metal levers which are pivoted either directly to the wheel forks of the bicycle frame or to a metal bridge arm which is bolted to such forks. Thus, in either event, if the bicycle frame is to be considered as an electrical "ground" for certain electrical appliances associated with the bicycle, these brake levers are effectively grounded to the bicycle frame by reason of their pivotal connections.

At the present time, use of bicycles for recreation purposes as well as for utilitarian purposes of convenient, inexpensive transportation, is increasing at a tremendous rate. This is due to two major factors in the U.S., one being the desire to adopt transportation means that do not use natural fuel sources, particularly petroleum fuels. The second is the desire to engage in healthful physical exercise.

With the great increase in the use of bicycles has developed a need for greater safety in connection with such use. With approximately 50 million bicycles being used in the U.S. and an additional 7 million being purchased each year, local and state governments are concerned with safety regulations for operation and use of bicycles. Whereas most such regulations now require the use of front headlights and rear lights or reflectors, there has been found to be a great need for further safety lights and particularly stop or brake lights, the use of which has been recognized as contributing greatly to reduction of risk of accident in night time bicycle use.

The stop light system of the present invention is predicated upon the fact that the bicycle frame, together with its associated caliper type brake levers, constitute an electrical ground and, in carrying out the invention, there are provided a conventional signal lamp assembly or unit and a battery pack for supplying electrical current to such signal lamp assembly. The signal lamp assembly embodies a casing which is adapted to be electrically connected or "grounded" to the bicycle frame and an electrical terminal adapted to be connected to the battery casing. The latter is in the form of a box-like housing for one or more conventional dry cell batteries, and means are provided for clamping or otherwise securing the casing in position on the bicycle frame. The battery casing or pack is provided with two electrical terminals, one of which is adapted to be connected to the terminal of the signal lamp and the other of which carries a flexible contact strip which may be cut to length and appropriately positioned so that it extends between one of the caliper type brake levers and the associated wheel and thus lies directly in the path of movement of the brake lever when the latter is actuated for braking purposes. Thus, at such time as the bicycle brake lever moves toward its associated wheel rim for braking purposes, it engages such contact strip and an electrical circuit is completed from the battery pack and its associated flexible contact strip, and the caliper brake lever, through the bicycle frame, through the signal lamp, through the conducting wire, to the terminal on the battery casing, and back to the battery, thus illuminating the signal lamp. As soon as the caliper brakes are released, the electrical circuit is interrupted and the signal lamp becomes extinguished. The provision of a stop light system such as has briefly been outlined above, constitutes the principal object of the present invention.

The provision of a bicycle stop light system which is extremely simple in its construction and which therefore may be manufactured at a low cost; one which is comprised largely of commercially available parts and assemblies, thereby further contributing to low cost; one which is readily adaptable without any modification whatsoever to all manner of bicycles, regardless of their make or design, the only criterion being that they be supplied with caliper type brakes; one which may be manufactured as original equipment or may be readily applied to existing bicycles; one which requires no particular degree of skill for its installation on the existing bicycle; one which is devoid of relatively moving parts and which therefore is unlikely to get out of order; one which is rugged and durable and which therefore will withstand rough usage; and one which otherwise is well adapted to perform the services required of it, are further desirable features which have been borne in mind in the production and development of the present invention.

Other objects and advantages of the invention, not at this time enumerated, will become readily apparent as the nature of the invention is better understood.

In the accompanying single sheet of drawings forming a part of this specification, one illustrative embodiment of the invention has been shown.

Figure 1:
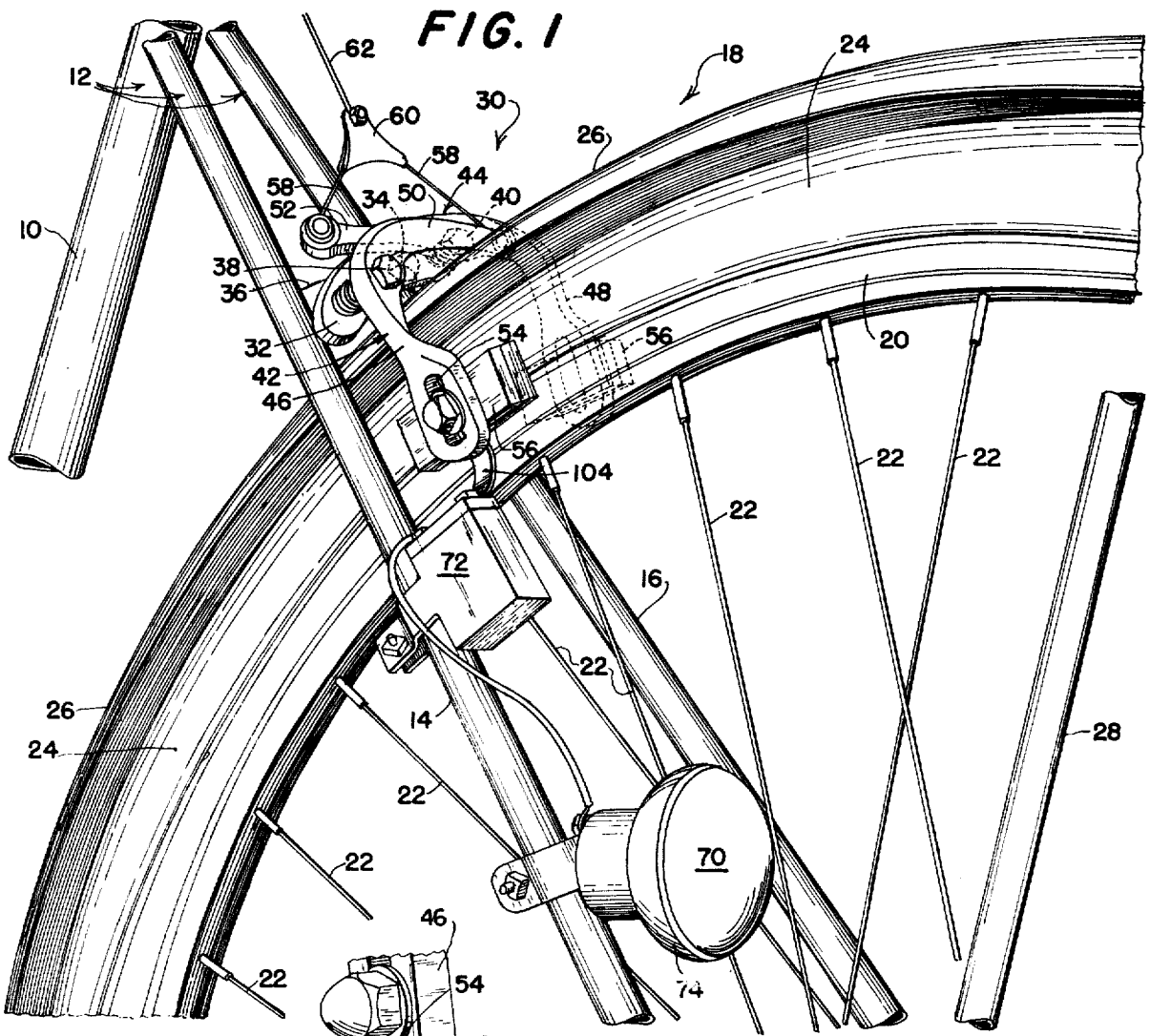
FIG. 1 is a fragmentary perspective view of the rear portion of a bicycle frame, the view being taken in the vicinity of the rear wheel caliper brake mechanism and showing the present bicycle stop light assembly operatively applied thereto.

Referring now to the drawings in detail and in particular to FIG. 1, there is disclosed in this view a fragmentary portion of a conventional bicycle including a main frame bar 10 from which there projects rearwardly and downwardly the usual rear wheel-supporting fork 12 which embodies a left fork member or tine 14 and a right fork member or tine 16. It will be understood, of course, that the distal ends of the two fork members 12 and 14 are provided with conventional wheel axle-supporting facilities by means of which the rear wheel 18 is rotatably supported. The wheel 18 is provided with the usual metal wheel rim 20, wire spokes 22, a rubber pneumatic tire 24 and other wheel accoutrements which do not appear herein since they bear no direct relationship to the present invention. A wheel fender 26 overlies the tire 24 and is provided with the usual radial fender struts or supports, one of which is designated at 28.

A conventional rear caliper-type brake unit or assembly 30 is operatively mounted on the rear fork 12, the assembly selected for illustration herein being of the center pull type and embodying what is commonly referred to in the art as a brake arm bridge 32, the latter being fixedly secured by a bolt 34 to a crossbar 36 which extends horizontally between the two fork members 14 and 16. Pivotally secured by bolts 38 and 40 to the opposite end regions of the brake arm bridge 32 are a pair of brake levers including an outer lever 42 and an inner lever 44. The lever arms 42 and 44 are generally of L-shaped design and include vertical lever arms 46 and 48 which straddle the fender 26, tire 24 and rim 20 and horizontal arms 50 and 52 which overlie the wheel 18. The lower ends of the vertical lever arms 46 and 48 are formed with pin and slot connections 54 for adjustably supporting the usual friction brake shoes 56. The ends of the horizontal lever arms 50 and 52 are connected together by a flexible bridging cable or bridle 58 and a cable anchor plate 60 connects the medial region of the bridle 58 to a pull cable 62 leading to the usual brake handle (not shown) on the bicycle handlebar.

From the above description it will be apparent that when the brake handle is actuated to apply tension to the pull cable 62 in the usual manner of caliper brake operation, the consequent upward movement of the ends of the horizontal arms 50 and 52 of the outer and inner levers 42 and 44 will rock these levers about their respective pivot bolts 38 and 40 and effect inward motion of the brake shoes 56 until such time as these shoes frictionally engage the wheel rim 20 for braking purposes.

The arrangement of parts thus far described is purely conventional and no claim is made herein to any novelty associated with the same. Insofar as the caliper type brake unit 30 is concerned, a wide variety of such units are available for bicycle braking purposes, the particular unit illustrated herein being of the general type which is manufactured and sold by Delaware Metal Co. Inc. of Stanford, N.Y., under the trade name Weinmann Caliper Brake, Model No. 999. The novelty of the present invention resides rather in the provision of a novel two-component stop light signal system embodying a signal lamp and a battery pack, both components being capable of ease of attachment to a bicycle frame and the latter component having associated therewith an electrical contact element which cooperates with the caliper type brake unit 30 in such a manner that when the brake unit is applied for braking purposes, an electric circuit will be completed through the signal lamp, all in a manner that will be described in detail and subsequently claimed.

Figure 2:
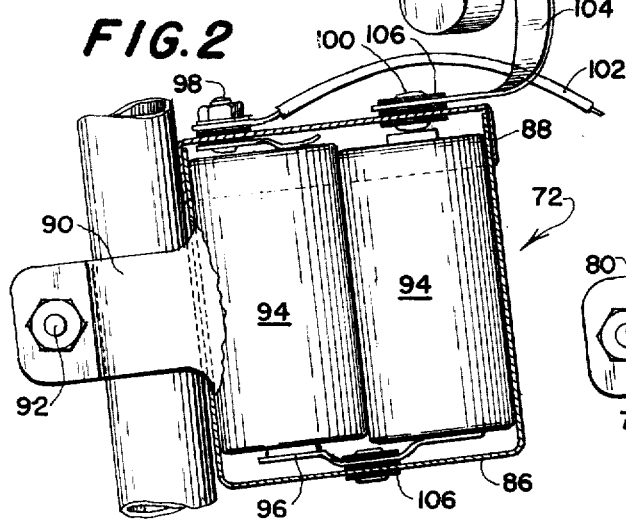
FIG. 2 is an enlarged view of the battery pack and its associated flexible contact strip, showing the battery pack mounted on one of the rear bicycle wheel fork arms and illustrating the relationship of such contact strip with the adjacent caliper brake lever.

Still referring to FIG. 1, the aforementioned two-component signal system of the present invention includes a signal lamp component 70 (See also FIG. 3) and a battery pack component 72 (See also FIG. 2). For proper rear viewing of the signal lamp component which will hereinafter be referred to simply as the stop light, the latter is mounted on the fork member or tine 14 at a selected position above the wheel hub, while the battery pack 72 is also mounted on the tine 14 a slight distance below the general level of the caliper brake unit 30. The particular fork tine selected for such mounting of the two components 70 and 72 is optional, if desired, these components may be mounted on the fork tine 16 or, alternatively, under certain circumstances, one component may be mounted on the fork tine 14 and the other component on the fork tine 16. Irrespective, however, of the particular mounting of the components 70 and 72, the essential features of the signal system remain unaltered.

Figure 3:
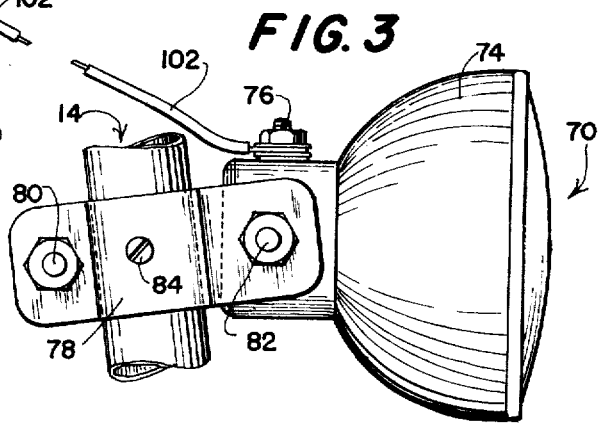
FIG. 3 is an enlarged view of the signal lamp, showing the same operatively applied to the fork arm of FIG. 2.

Considering now the signal lamp 70 and referring specifically to FIG. 3, this lamp is in the form of a commercially available unit or assembly, and it includes a metal outer casing 74 within which there is enclosed the usual lamp bulb, reflector and other essential elements or parts (not shown). An electrical contact terminal or binding post 76 on the casing 74 provides a lead-in for electric current to the lamp bulb, while the lead-out connection for such bulb is established by the metal casing itself. A grounding bracket 78 serves to support the signal lamp on the fork tine 14, suitable bolts 80 and 82 being provided to hold the lamp 70 in position. A pointed grounding screw 84 is threadedly received through the bracket 78 and is used to penetrate the paint or enamel which may be present on the fork as is customary in connection with such signal lamps.

The battery pack 72 (FIG. 2) is in the form of a box-like structure which may be formed of any suitable material, as for example, molded plastic or metal. It is comprised of a battery-containing body portion or casing 86 and a tight friction fitted telescopic over 88. The casing 86 is held in position on the fork tine 14 by means of a pair of attachment ears 90 which project laterally from the casing, straddle the fork tine 14, and are clamped thereagainst by means of a clamping bolt 92. Although attachment ears 90 are illustrated as having provision for a single clamping bolt 92, it may be desirable to include more than one hole, because the casing 86 must be rigidly attached for proper operation, and therefore, if various sizes of fork tine 14 are contemplated, provision for tightest possible clamping is important. A pair of dry cell batteries 94 are disposed within the casing 86 and preferably are in the form of conventional D-type cells arranged in electrical series relationship by means of a bridging contact strip 96 suitably supported on the bottom wall of the casing. It will be appreciated that if the housing is formed of plastic rather than metal, the insulating washers shown at 106 are not needed. The cover 88 is provided with a negative contact terminal 98 and a positive contact terminal 100, the terminal 98 being connected to the binding post 76 of the signal lamp 70 by a flexible conductor or lead 102.

The contact terminal 98 is in the form of a conventional binding post by means of which the conductor 102 may be releasably connected thereto, while the contact terminal 100 may be a permanent rivet-type terminal from which there projects outwardly a flexible contact strip 104 of ribbon-like construction and which preferably is formed of beryllium copper or like material which possesses a considerable degree of flexibility yet is capable of being restored to its original position by spring action after bending stresses within predetermined limits which are applied thereto are relieved. Contact terminal 100 may be of a screw terminal type as is terminal 98, because there may be advantage in having a capability of adjustment of contact strip 104 for proper contact positioning. With a screw and nut terminal arrangement, this might be more possible than with the rivet arrangement shown in the drawings.

Installation of the battery pack 72 on the fork tine 14 is effected by applying the attachment ears to the tine in the manner previously set forth and in the vicinity of the caliper brake assembly 30. The battery must be secured tightly to prevent movement. To assist in achieving this objective, when the battery housing is of molded plastic, the inner portion between respective ears is contoured to fit the curved surface of the fork tine and give greater friction contact to reduce slippage or movement after mounting. The contact strip 104 is adjusted by a suitable twisting or bending operation so that its outer end projects upwardly as shown in FIG. 1 into the space which exists between a metal portion of the vertical lever arm 46 of the outer lever 42 and the wheel rim 20, and thus lies directly in the path of inward movement of such lever arm when the rear bicycle brake is applied for braking purposes. In order to facilitate proper adjustment of the contact strip 104 for cooperation with the lever arm 46, it is contemplated that the rivet-like connection for the proximate end of the terminal 100 may be sufficiently tight as to ensure good electrical contact while at the same time allowing for forcible angular turning movement of the contact strip 104 on the cover 88. Additionally, in the manufacture of the battery pack, the contact strip 104 may be of excess length so that, if required, a limited amount of the distal end region of such strip may be removed, utilizing a shears for this purpose. Contact strip 104 may have its distal end formed as a "T" (Not shown) in order to provide greater contact area and ease in obtaining contact with the lever arm 46 with minimum amount of adjusting.

It is to be noted at this point that the electrical terminals 98 and 100, and also the bridging contact strip 96, are shown as being insulated electrically by dielectric washers 106 from the cover 88 and casing 86 inasmuch as these battery-enclosing members are illustrated herein as being formed of metal. In actual practice, however, the cover and casing will preferably be formed of a suitable plastic material, in which case the dielectric insulating washers will not be necessary.

In the operation of the herein described bicycle stop light system, since the flexible contact strip 104 is normally out of contact with the vertical lever arm 46 of the outer lever 42 of the caliper brake assembly 30, the electrical circuit for the signal lamp 74 is open so that the lamp will not be energized. However, as soon as the rear caliper brake is applied for braking purposes so that the lever arm 46 moves inwardly toward the wheel rim 20 in order to apply the associated brake shoe 56 to such rim, the arm 46 moves into engagement and electrical contact with the contact strip 104, whereupon an electrical circuit will extend from the fork tine 14 (considered herein as an electrical ground), through the bracket 78, signal lamp casing 74, its contained lamp bulb (not shown), contact terminal or binding post 76, conductor 102, negative terminal 98 of the battery pack, the two series arranged batteries 94 by reason of the bridging contact strip 96, the positive terminal 100, the lever arm 42, pivot bolt 38, brake arm bridge 32, bolt 34, and crossbar 36, back to the fork tine 14, thereby completing the electrical circuit through the signal lamp and causing illumination thereof. Upon release of the caliper brake assembly 30, the lever arm 46 will move away from the flexible contact strip 104, thus interrupting the electric circuit and extinguishing the signal lamp 70.

The invention is not to be limited to the exact arrangement of parts shown in the accompanying drawings or described in this specification as various changes in the details of construction may be resorted to without departing from the spirit of the invention. For example, although the battery pack 72 is shown and described as being mounted on one of the rear fork tines 14, if desired, such member may be readily mounted on either of the fork tines associated with the front bicycle fork, in which case the contact strip 104 will be properly adjusted for cooperation with the caliper brake which functions in connection with the front wheel of the bicycle. Similarly, the signal lamp 70 may be mounted at any suitable position on the bicycle frame, although the preferred position thereof is on one of the rear fork tines. Therefore, only insofar as the invention has particularly been pointed out in the accompanying claims is the same to be limited.

What is claimed is:

1. In a bicycle having a metal frame including a wheel-supporting fork provided with fork members which straddle and serve to rotatably support one of the bicycle wheels, a caliper brake assembly effectively mounted on said fork and including a pair of brake levers electrically connected to and pivotally mounted for swinging movement on said fork and having respective lever arms provided with brake shoes thereon, said lever arms being movable toward and away from each other simultaneously in unison between normally retracted positions of brake release wherein said shoes are out of frictional contact with said rim region, and advanced positions of brake applicaton wherein such shoes frictionally engage the opposite sides of said rim region, and means for actuating said caliper brake assembly, the improvement which comprises a two-component stop light signalling system for the bicycle and embodying a signal lamp component and a battery pack component, said signal lamp component including a casing mounted on and electrically connected to said frame and having an electrical binding post terminal, said battery pack component including a casing fixedly mounted on one of said fork members in the vicinity of said caliper brake assembly and provided with an electrical binding post terminal and a contact terminal, a flexible conductor extending between said binding post terminals, and a flexible contact strip having its proximate end mounted on said contact terminal and having its distal end region projecting into the space which exists between the adjacent lever arm and the rim region of the bicycle wheel, said distal end region being disposed directly in the path of movement of said latter lever arm and designed for electrical contact therewith upon application of the caliper brake assembly whereby an electrical circuit is established from the bicycle frame, through the signal lamp component, flexible conductor, battery pack, flexible contact strip, the adjacent lever arm and back to the frame.

2. In a bicycle, the improvement set forth in claim 1, wherein said battery pack component is mounted on said one fork member below the level of said caliper brake assembly and the flexible contact strip projects generally upwardly and inwardly toward said rim region of the wheel, and the signal lamp component is mounted on said latter fork member at a level below the battery pack component.

3. In a bicycle, the improvement set forth in claim 2, wherein the casting of said battery pack component is of box-like construction and embodies a pair of integrally formed attachment ears which straddle said one fork member, and a clamping bolt projects through said attachment ears and serves to draw the same together in clamping relationship relative to the fork member.

* * * * *